Figure 1:
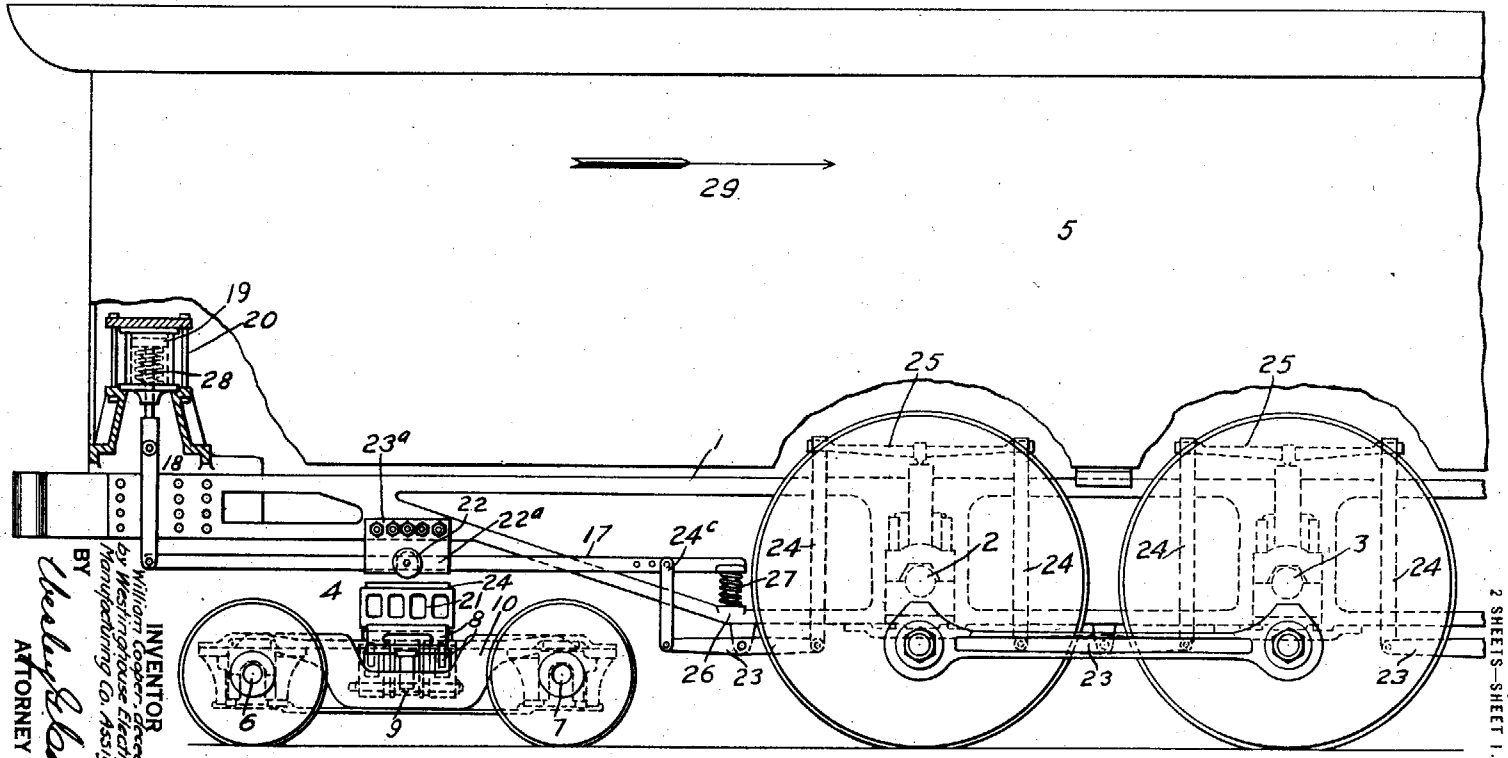

W. COOPER, DEC'D.

WESTINGHOUSE ELECTRIC & MANUFACTURING COMPANY, ASSIGNEE.

RAILWAY VEHICLE.

APPLICATION FILED DEC. 20, 1916.

Reissued Sept. 11, 1917.

14,350.

2 SHEETS—SHEET 1.

WITNESSES:

Ed Plinke

W. B. Wells,

INVENTOR

William Cooper, deceased by Westinghouse Electric & Manufacturing Co. Assignee

BY

Wesley G. Carr

ATTORNEY

W. COOPER, DEC'D.
WESTINGHOUSE ELECTRIC & MANUFACTURING COMPANY, ASSIGNEE.
RAILWAY VEHICLE.
APPLICATION FILED DEC. 20, 1916.

Reissued Sept. 11, 1917.

14,350.

2 SHEETS—SHEET 2.

WITNESSES:
Ed Plinke.
W. B. Wells.

INVENTOR
William Cooper, deceased
by Westinghouse Electric + Manufacturing Co. Assignee
BY
Wesley G. Carr
ATTORNEY

UNITED STATES PATENT OFFICE.

WILLIAM COOPER, DECEASED, LATE OF PITTSBURGH, PENNSYLVANIA, BY WESTINGHOUSE ELECTRIC & MANUFACTURING COMPANY, A CORPORATION OF PENNSYLVANIA, ASSIGNEE.

RAILWAY-VEHICLE.

14,350. Specification of Reissued Letters Patent. Reissued Sept. 11, 1917.

Original application filed March 2, 1910, Serial No. 546,853. Renewed December 7, 1914, Serial No. 875,964. Original No. 1,166,187, dated December 28, 1915. Application for reissue filed December 20, 1916. Serial No. 138,136.

*To all whom it may concern:*

Be it known that WILLIAM COOPER, deceased, late of Pittsburgh, in the county of Allegheny and State of Pennsylvania, during his lifetime invented certain new and useful Improvements in Railway-Vehicles, and that the WESTINGHOUSE ELECTRIC & MANUFACTURING COMPANY, a corporation organized and existing under the laws of Pennsylvania, assignee of WILLIAM COOPER, now deceased, hereby declares to the best of its knowledge and belief that the following specification, taken in connection with the drawings furnished and forming a part of the same, is a clear, true, and complete description of said improvement.

My invention relates to railway vehicles and particularly to such electrically propelled vehicles as comprise a pair of guide trucks located at the respective ends of the cab or body and a plurality of interposed driving wheel axles.

One object of my invention is to so construct and equip a railway vehicle of the class above indicated that its body may be virtually supported at three points, one of which is substantially in the center of the leading truck for either direction of operation.

I have for a second object to provide means, under the control of the vehicle driver, for locking swing bolster trucks, such as are ordinarily employed in locomotive practice, against swinging, as desired, whereby the stability of the vehicle in operation may be increased by preventing the swinging of the trailing truck while permitting its swiveling movement.

Another object of my invention is to provide means for locking the trailing truck of the locomotive against both swinging and swiveling in order to increase the rigid wheel base of the locomotive, without relinquishing the leading action of the swivel truck at the forward end of the vehicle for either direction of operation.

In electric locomotives having a plurality of driving axles constituting a rigid wheelbase and two swivel trucks located at the respective ends, as heretofore constructed, the vehicle body has ordinarily been supported close to the king pin, the trucks being virtually single-point supporting trucks. A large proportion of the weight is of course borne by the driving axles, a system of equalizing bars being usually provided in order to properly distribute the weight and to permit the body to be resiliently mounted. This arrangement, however, is substantially equivalent to a two-point support and, therefore, with single-bearing swivel trucks, four points of support for the vehicle body, are provided. If side-bearing swivel trucks are substituted for the trucks having single-point supports, the stability of the locomotive is obviously not improved, since neither a four-point nor a six-point support is considered desirable for service of this character.

The difficulty might be partially overcome by locating a single bearing truck at the leading end of the locomotive and a side-bearing truck at the trailing end. This arrangement, however, would be of advantage only when the locomotive is operated solely in one direction.

In order to improve the stability and the operating characteristics of railway locomotives provided with electric driving motors of large size, which are located in the cab, I provide means for changing each of the swivel trucks, which are located at the respective ends of the locomotive, from a single bearing to a side-bearing supporting truck, as desired.

Means are also provided for locking the trucks against either swinging, or swinging and swiveling, as hereinafter pointed out.

In securing the objective results referred to above without limiting the locomotive to one direction of travel, I utilize single bearing swivel trucks, and provide means for so changing the trailing truck that it supports the body at two points without interfering, in any way, with the operation of the locomotive. The means which I prefer to employ are so simple that the locomotive driver is able to effect the change by admitting air pressure to a cylinder or cylinders, very much as air pressure is admitted to the brake cylinders of the locomotive. Furthermore, the equalizing system is enlarged to include the trailing truck of which it is normally independent.

Figure 2:
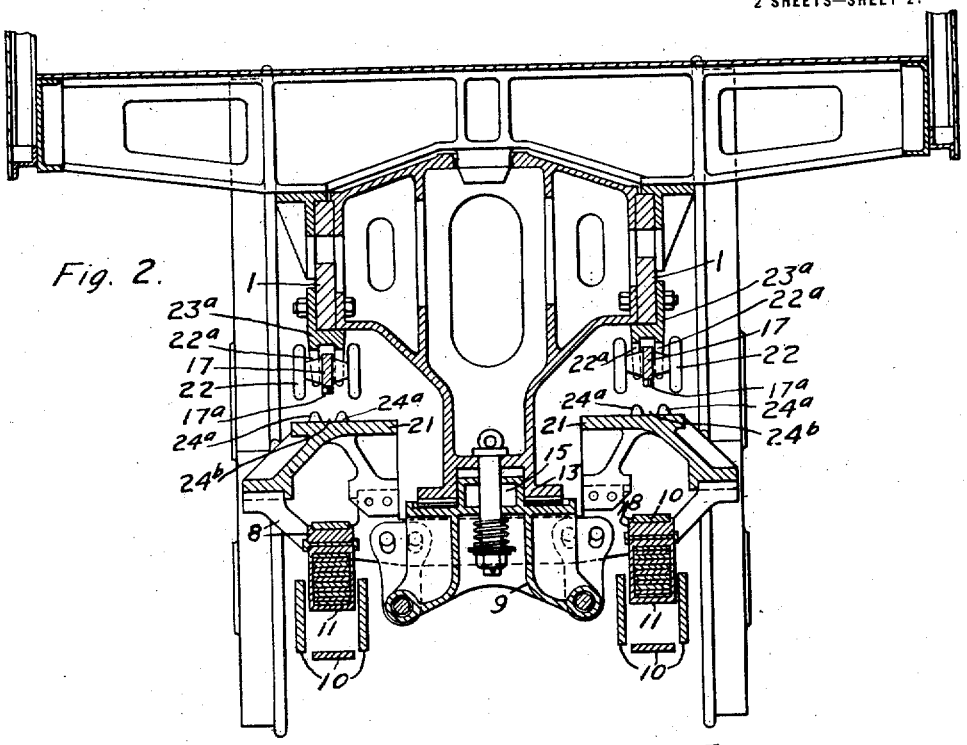
Figure 3:
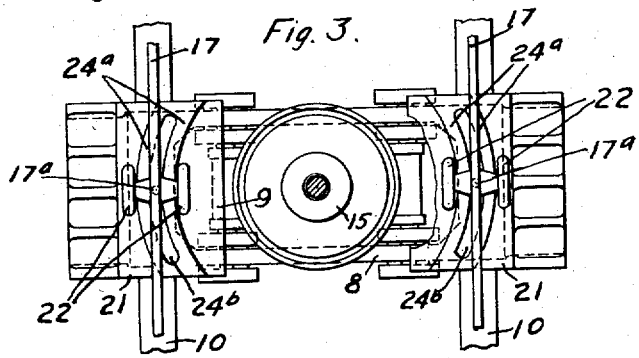
Figure 4:
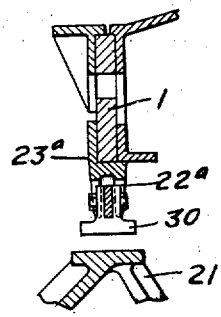

In the accompanying drawings, Figure 1 is a partial side elevation of a locomotive constructed in accordance with my invention, a portion of one side of the cab being broken away. Fig. 2 is an end elevation, partially in cross-section, of the running gear of the locomotive showing one of the swing bolster guide trucks. Fig. 3 is a partial plan view of the bolster and certain of the details shown in Fig. 2, and Fig. 4 is a view corresponding to Fig. 2 but showing only a part of a slightly modified structure which embodies my invention.

Referring to the drawings, the locomotive here shown comprises a frame 1 which is supported by driving-axles 2 and 3 and swivel trucks 4 (only one of which is shown) located at the respective ends of the vehicle, and a cab 5, which is mounted on the frame.

Each of the trucks 4 comprises a pair of wheel-axles 6 and 7, a bolster 8, a swing center 9, and a truck frame 10, the bolster being resiliently supported upon the truck frame by means of springs 11. The vehicle frame 1 is provided with body bolsters 12 which are directly above the truck-bolsters and each of them is provided with a swiveling plate 13 having a cylindrical recess 14 which is engaged by a coöperating cylindrical projection 15 of the swing center 9, the arrangement of parts being such that each of the trucks 4 is adapted to swivel about its cylindrical projection 15 as an axis.

It is evident that the above described connection between the body of the vehicle and the trucks virtually constitutes a single-point support and, in order to increase the stability of the vehicle body, I provide a pair of levers 17 which are connected at their inner ends, as hereinafter set forth, to the equalizing system with which the locomotive is equipped, the opposite ends of the rods being connected by links 18, to pistons 19 which operate within cylinders 20 that are rigidly secured to the vehicle body. The levers 17 are provided with rollers 22 that are adapted to rest upon the upper surfaces of brackets 21, that are secured to and form parts of the truck bolsters 8, when the pistons 19 are forced downwardly by the admission of compressed air to the cylinders 20. Positioning pins $17^a$ are also associated with the levers 17 for a purpose to be hereinafter explained.

The levers 17 are guided and are prevented from being displaced laterally by sets of projections $22^a$ which extend downwardly from brackets $23^a$ that are secured to the locomotive side frames 1 by bolts or other suitable means. The brackets 21 are provided with sets of upwardly extending curved guide projections $24^a$ which are concentrically related to the axis of the pivotal truck 4 and are spaced apart to provide slots $24^b$ to receive the positioning pins $17^a$ when the levers 17 occupy their lower positions. The parts are so arranged that the levers 17 normally rest between the guide projections $22^a$ except when the pistons 19 are forced downwardly by the admission of air to the cylinders 20. When this action takes place the rollers 22 are pressed downwardly against the upper surfaces of the brackets 21 and the positioning pins $17^a$ are entered into the curved slots $24^b$. In this position the truck bolster 8 is prevented from swinging since the vehicle frame and the truck bolster are locked against relative lateral displacement, while the swiveling action of the truck is still permitted by reason of the contour of the guide members $24^a$.

The equalizing system comprises a plurality of levers 23, links 24, and springs 25, which may be arranged in any suitable manner, that shown in Fig. 1 of the drawings being the usual arrangement. The end links $24^c$ of the system are connected to the inner ends of the rods 17 instead of being affixed to the vehicle frame. The extremities of the rods 17, however, extend slightly beyond the points of connection with the links $24^c$ and are supported by projections 26 of the frame 1 and interposed springs 27. Each of the pistons 19 is provided with a spring 28 which acts in opposition to the air pressure within the cylinder 20 and tends to keep the rollers 22 out of engagement with the corresponding brackets 21.

It is evident that, under normal conditions, the equalizing links $24^c$ are virtually connected to the vehicle frame through the springs 27, since the points of connection between the links and the rods 17 are close to the springs 27 and are materially separated from the opposite ends of the rods.

Since the two ends of the locomotive are substantially identical, I have only shown one end in order to use a larger scale and so make the drawings clearer.

When it is desired to operate the locomotive in one direction (for example in that indicated by the arrow 29 in Fig. 1), the stability of the locomotive body may be improved materially by applying compressed air to the cylinders 20 above the piston 19 at the trailing end of the locomotive. When this is done, the pistons are forced downwardly in opposition to the springs 28 and the rollers 22 are pressed into engagement with the brackets 21 of truck bolster 8 with sufficient force to slightly separate the thrust-bearing surfaces of the swing center 9 and the plate 13. In this way, the truck is converted into a side-bearing swivel truck, the weight of the body which is borne by the truck being supported near the ends of the truck bolster 8 instead of at its central point.

The downward pressure on the outer ends of the levers 17 relieves the springs 27 of the weight normally borne at these points and makes the levers 17 parts of the equalizing system already described. Hence, the locomotive is virtually supported at three points, one being at the center of the leading truck and the other two in the enlarged equalizing system.

In operating the locomotive in the opposite direction, pressure should be applied to the cylinders at the opposite end of the vehicle. By this means, it is possible to maintain corresponding relations for either direction of travel.

If the rigid wheel base of the locomotive is relatively short, the stability of the vehicle in operation may be increased by substituting friction shoes 30 such as are shown in Fig. 4 for the rollers 22 of the other figures, while no curved guide projections are required. If pressure is applied to the rear cylinders 20, with this arrangement, not only is the trailing truck converted from a single to a side bearing truck, but, furthermore, the trailing truck becomes a part of the rigid wheel base of the locomotive.

I believe that my invention is broadly new, the structures illustrated in the drawings being only intended to represent an operative means for practising the same. Various other devices for accomplishing the same result will undoubtedly suggest themselves to those skilled in the art, and I desire, therefore, that only such limitations shall be imposed as are indicated in the appended claims.

I claim as my invention:

1. In a railway vehicle, the combination with a body frame and a swivel truck comprising a pair of truck wheel axles and a frame having a truck bolster upon which the body is centrally supported, of means for transferring the weight of the body to two side points of support which are located near the respective ends of the truck bolster.

2. In a railway vehicle, the combination with a body and a truck comprising wheel axles and a frame having a bolster upon which the body is pivotally supported, of means for temporarily supporting the body at two points which are located near the respective ends of the bolster without interfering with the swiveling of the truck.

3. In a locomotive, the combination with a body, a pair of swivel trucks upon which the body is supported, driving wheel axles located between the trucks, and equalizers for carrying a portion of the weight upon the driving wheel-axles, of pneumatically operated means for changing the points of support for the body from the centers of the trucks to points near their sides and between the truck axles.

4. In a locomotive, the combination with a frame having body bolsters near its ends, a pair of swivel trucks upon which the frame is supported at the centers of the body bolsters, driving wheel-axles located between the swivel trucks, and equalizers comprising side springs above the respective driving axles, levers pivotally mounted on the frame and links connecting the ends of the springs to the levers for throwing a portion of the weight upon the driving wheel-axles, of levers that are connected to the equalizers and extend over the trucks, and means carried by the frame for forcing the levers into engagement with the truck bolsters near their ends to change the points of support from the centers of the body bolsters to points near their ends, as desired.

5. In a railway vehicle, the combination with a body member having swivel trucks located at its respective ends and interposed driving wheel-axles constituting a rigid wheel base, of means for locking the trucks against swiveling.

6. In a railway vehicle, the combination with a body member having swivel trucks located at its respective ends, and interposed driving wheel-axles constituting a rigid wheel-base, of means for locking the trucks against swiveling, whereby the trailing truck becomes a part of the rigid wheel-base for either direction of travel.

7. In a railway vehicle, the combination with a body having swivel trucks at its ends, interposed driving wheel-axles constituting a rigid wheel-base and equalizers for yieldingly mounting the body on the driving wheel-axles, of levers forming extensions to the equalizers and projecting over the sides of the trucks, friction shoes attached to the levers, and means for forcing the friction shoes into engagement with the bolster, whereby the point of support is transferred from the center to the sides of the truck and the truck is locked against swiveling, as desired.

8. In a railway vehicle, the combination with a body having center-bearing swivel trucks at its ends interposed driving wheel-axles constituting a rigid wheel-base, and equalizers for yieldingly mounting the body upon the driving wheel-axles, of levers forming extensions to the equalizers and projecting over the sides of the trucks, friction shoes carried by the levers, and actuating cylinders and pistons carried by the vehicle body for forcing the shoes into engagement with the trucks, whereby the trailing truck may be changed from a center to a side-bearing truck and be locked against swiveling.

9. In a vehicle, the combination with a body and a truck having a swing bolster, of means for preventing the swinging of the bolster.

10. In a railway vehicle, the combination with a body and a center-bearing truck having a swing bolster, of means for converting the truck from a center to a side-bearing truck and for locking the truck bolster against swinging.

11. In a railway vehicle, the combination with a body, driving wheel axles and center-bearing swivel trucks on which the body is supported, of a system of equalizers by which the weight is distributed on the driving wheel axles, and means for extending the equalizers to include the swivel trucks and for converting them from center to side-bearing trucks, as desired.

12. In a railway vehicle, the combination with a body and a truck embodying a swing truck bolster, of means for temporarily preventing the swinging of the truck bolster and for converting the truck from a center to a side-bearing truck.

13. In a railway vehicle, the combination with a body member and swivel trucks located at its respective ends and having swing bolsters, of means for locking the trucks against swiveling and preventing the swinging of the truck bolsters.

14. In a railway vehicle, the combination with a body member, swivel trucks located at its respective ends and having swing bolsters, and interposed driving wheel axles constituting a rigid wheel base, of means for locking the truck bolsters against swinging and for preventing the trucks from swiveling, whereby the trailing truck becomes a part of the rigid wheel base of the vehicle for either direction of travel.

15. In a vehicle, the combination with a pivotal truck, of means for locking said truck against pivotal movement and redistributing the load thereon.

16. In a vehicle, the combination with a pivotal truck, of means controllable from the vehicle for converting said truck into a rigid side-bearing truck.

17. In a vehicle, the combination with a body and a pivotal truck, of means for locking said truck to said body in alinement therewith and transferring the load from the center to the sides of said truck.

18. In a vehicle, the combination with a body and a pivotal truck, of power-operated means for preventing relative pivotal movements of said truck and body.

19. In a vehicle, the combination with a plurality of pivotal trucks, of means for locking the rear truck against pivotal movement and redistributing the load thereon.

20. In a vehicle, the combination with a plurality of pivotal trucks, of means for converting the rear truck into a rigid side-bearing truck in either direction of operation.

21. In a vehicle adapted for operation in opposite directions, the combination with a plurality of pivotal trucks, of selective means for converting the trailing truck into a rigid truck having side bearings.

22. In a vehicle, the combination with a body and a pivotal center-bearing truck, of controllable means for transferring the weight of the body to a plurality of transversely disposed points in substantially the middle transverse plane of the truck.

23. In a vehicle, the combination with a body and a pivotal center-bearing truck, of controllable means for transferring the weight of the body to a plurality of points in substantially the transverse plane of the pivotal connection.

24. In a vehicle, the combination with a body, and a multi-axle truck having a pivotal connection to said body, of controllable means for supporting said body solely upon transversely disposed points intermediate the truck axles.

25. In a vehicle, the combination with a body and a pivotal truck for supporting said body, of manually controllable means for supporting said body solely upon a plurality of transversely disposed points without interfering with the pivotal movement of the truck.

26. In a vehicle, the combination with a body and a pivotal truck having a swing-bolster, of means for locking said bolster against swinging while permitting pivotal movements of said truck.

27. In a vehicle, the combination with a body and a pivotal truck having a swing-bolster, of means for locking said bolster against swinging and preventing pivotal movements of said truck.

28. In a railway vehicle, the combination with a body, driving wheel axles and center-bearing swivel trucks on which the body is supported, of a system of equalizers by which the weight is distributed on the driving wheel axles, and means for extending the equalizers to include the swivel trucks and for locking said trucks against swiveling.

29. In a railway vehicle, the combination with a body, driving wheel axles and center-bearing swivel trucks on which the body is supported, of a system of equalizers by which the weight is distributed on the driving wheel axles, and means for converting the swivel trucks into rigid trucks and for extending the equalizers to include said trucks.

30. In a vehicle, the combination with a body, a main truck and an equalizer system for normally supporting said body, of a pivotal truck associated therewith, and controllable means for including said truck in said equalizer system.

31. In a vehicle, the combination with a body, driving wheel axles, and a plurality of end pivotal trucks, of an equalizer system for normally providing flexible side suspensions for said body upon said driving wheel axles and controllable means for including one of said trucks in said equalizer system whereby a virtual three-point suspension for said body is provided.

32. In a vehicle, the combination with a body, driving wheel axles constituting a rigid wheel base, and a plurality of end guiding trucks, of equalizing means for supporting said body solely upon said driving wheels and the rear guiding truck in either direction of operation.

33. In a vehicle, the combination with a body, driving wheel axles constituting a rigid wheel base, and a pivotal rear guiding truck, of means for increasing the length of the rigid wheel base to include said truck.

34. In a vehicle, the combination with a body, driving wheel axles constituting a rigid wheel base and a plurality of pivotal end guiding trucks, of means for extending the rigid wheel base to include the rear guiding truck.

35. In a vehicle, the combination with a body and a plurality of swing bolster end guiding trucks, of controllable means for locking the bolster of the trailing truck against swinging.

36. In a vehicle, the combination with a body and means for supporting said body, of selective means for effecting a three-point suspension for said body whereby the forward end thereof is supported at a single point in either direction of operation.

In testimony whereof, I have hereunto subscribed my name this 13th day of Dec., 1916.

WESTINGHOUSE ELECTRIC &
MFG. COMPANY,

By T. P. GAYLORD,
*Acting Vice-President.*

Copies of this patent may be obtained for five cents each, by addressing the "Commissioner of Patents, Washington, D. C."